Figure 1:
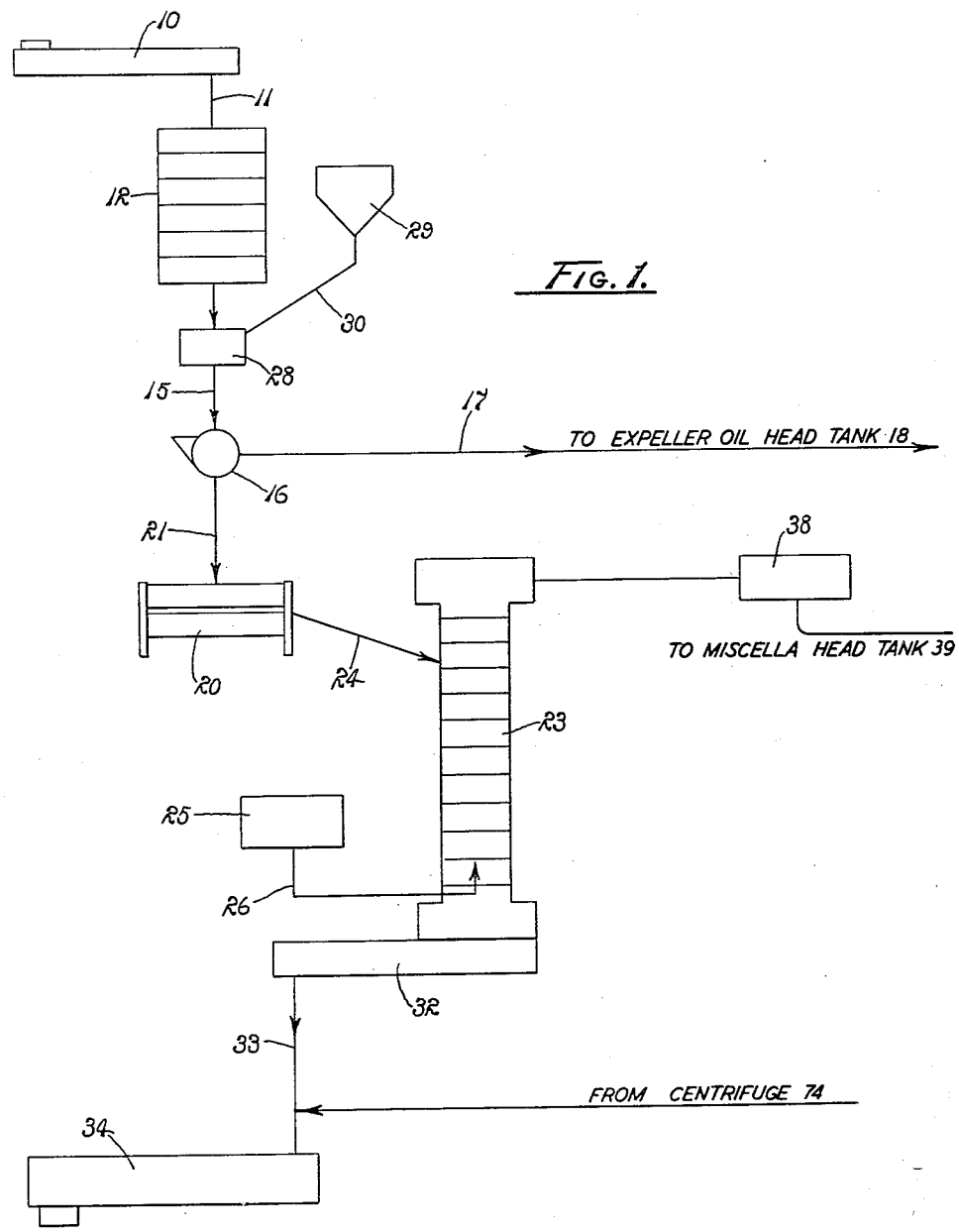

April 16, 1957 G. C. CAVANAGH 2,789,120
EXTRACTION AND REFINING OF GLYCERIDE OILS AND
FATS FROM SOURCE MATERIALS THEREOF
Filed July 7, 1953 3 Sheets-Sheet 1

GEORGE C. CAVANAGH
INVENTOR
HUEBNER, BEEHLER,
WORREL & HERZIG
ATTORNEYS
BY

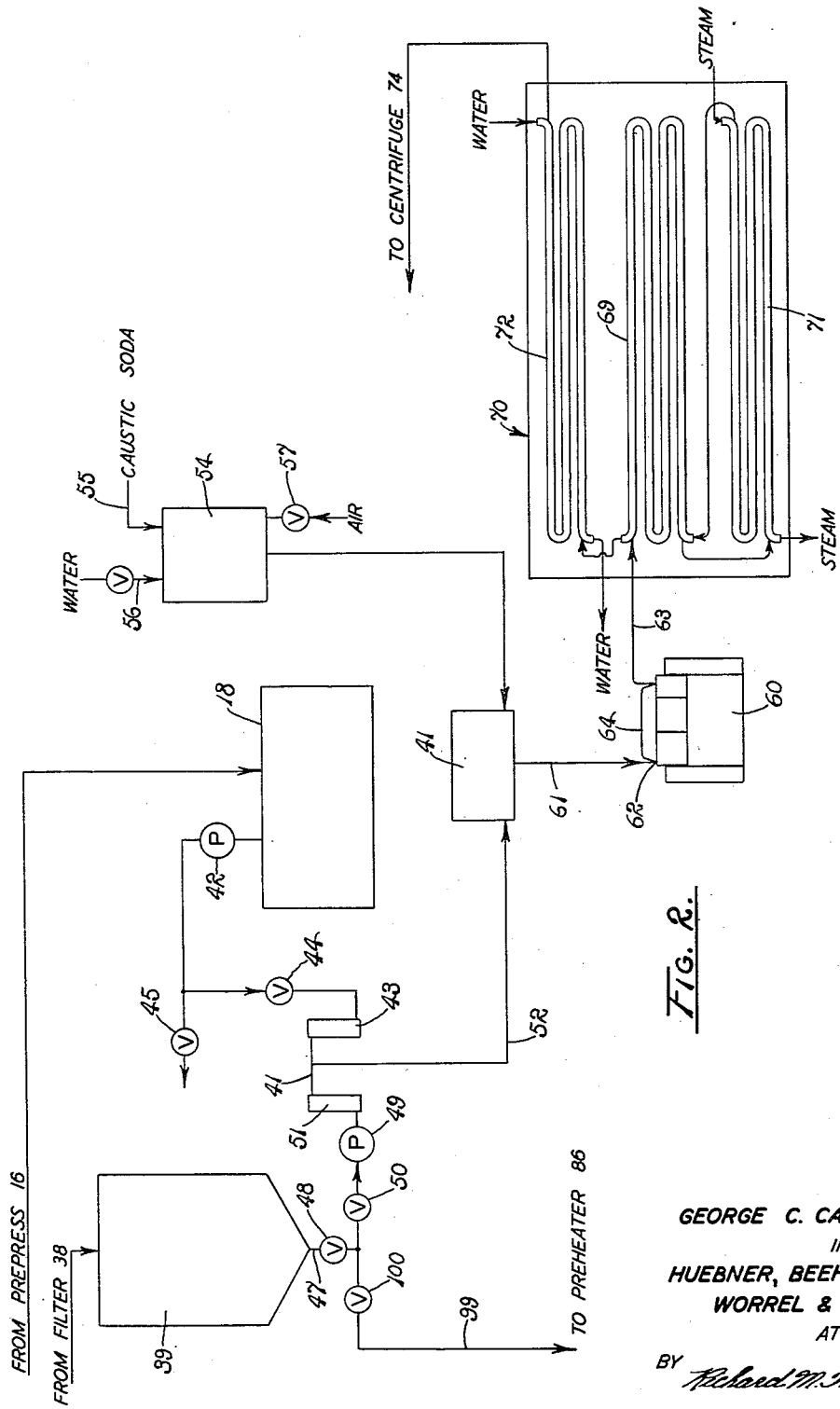

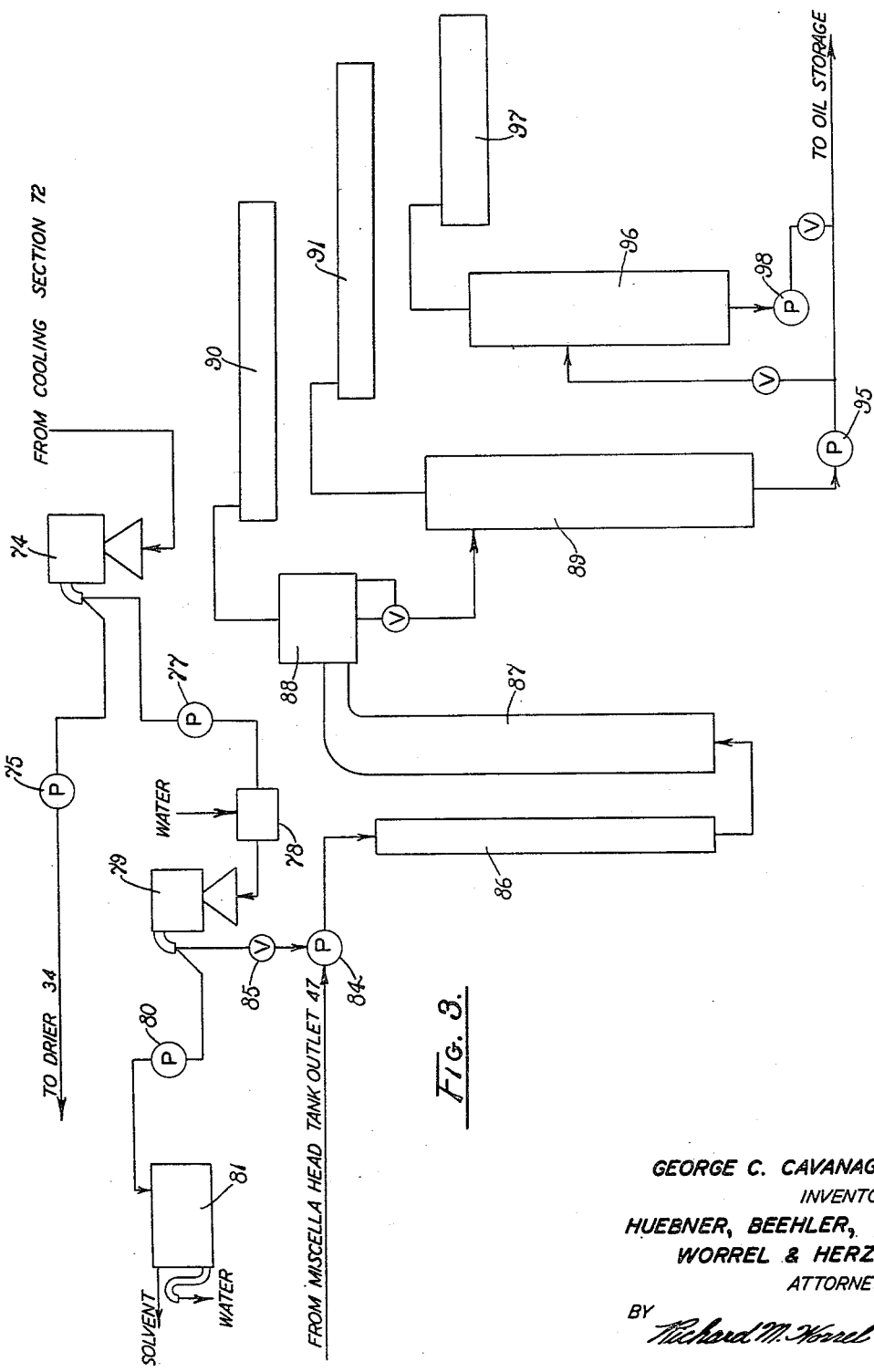

United States Patent Office 2,789,120
Patented Apr. 16, 1957

2,789,120

EXTRACTION AND REFINING OF GLYCERIDE OILS AND FATS FROM SOURCE MATERIALS THEREOF

George C. Cavanagh, Fresno, Calif., assignor to Ranchers Cotton Oil, Fresno, Calif.

Application July 7, 1953, Serial No. 366,458

8 Claims. (Cl. 260—426)

The present invention relates to the extraction and refining of glyceride oils and fats from solid materials of either botanic or biologic origin, typified by the numerous oil bearing vegetable materials and the oleaginous flesh of animals and fish, and more particularly to a process for refining during extraction which is adaptable to batch and continuous operations.

The extraction of valuable fats and oils from animal and vegetable materials for use as food has long been known. Such oils are likewise known as film forming constituents in paints, varnishes, enamels, plastics, drug products, soaps and the like. Their extractions are accomplished by numerous processes which have been highly perfected and are relatively efficient but all of which result in such extensive amounts of impurities in the resultant oil that it must be refined for most uses. The refining is expensive and results in loss of significant quantities of the oil. Perhaps the oldest known extraction process involves the application of pressure to oil bearing material whereby oil is compressed from the material in which it is initially contained. More modernly, solvent extract, friction extraction, and other extractive processes have become popular as well as combinations of such processes.

The impurities contained in conventionally extracted oils usually include free fatty acids, color bodies, waxes, gums, and a plethora of other impurities generally objectionable in glyceride oils. Further, residual materials remaining after the extraction of oil by conventional practices contain impurities requiring additional treatment for by-product utilization. For example, cotton seed residue contains objectionable quantities of free toxic gossypol which is harmful to animals.

While refining is usually required for animal oil, fish oil, tung oil, corn oil, cottonseed oil, soybean oil, castor oil, safflower oil, linseed oil, peanut oil and the like, the problem is acute in the conditioning of the large volumes of cottonseed oil for market because of the normally dark color of the extracted oil and its other impurities. For illustrative convenience, the extracting and refining process of the present invention is described herein in connection with the conditioning of cottonseed oil for market as well as the concurrent rendering of the cotton seed residue usable as a by-product.

An object of the invention is to provide a combined method of extracting and refining glyceride oils and fats from source materials thereof which makes possible a superior resultant oil with a lower refining loss.

Another object is to make possible the improved refinement of glyceride oils and fats.

Another object is to make possible the refining of glyceride oils and fats during their extraction from source materials thereof so that the resultant product is marketable without further treatment.

Another object is to provide an improved extracting and refining process for glyceride oils which can be practiced with a minimum amount of additional equipment to that generally available in glyceride oil refineries and/or extraction plants.

Another object is to provide an improved method for refining glyceride oils characterized by a refining loss closely approaching the Wesson or Theoretical loss which is applicable to various extracting processes but which possesses particular advantage when utilized in solvent extraction processes in closed systems.

Another object is economically to refine glyceride oils to a very low color as determinable by the Lovibond color chart or the Photometeric A. O. C. S. tentative method Cc 13c 50.

Another object is to refine glyceride oils in miscella without altering the concentration of the miscella to an appreciable extent.

Another object is to provide a refining process which utilizes caustic soda and which is characterized by low refining loss and low color value of oils refined thereby and the utlization of smaller quantities of caustic soda to accomplish the desired end than heretofor considered necessary.

Another object is to obviate or minimize excessive requirements for heating glyceride oils during their refining.

Another object is to increase the speed of refining of glyceride oils and thus reduce the losses incident to saponification.

Another object is effectively to refine glyceride oils with a minimum amount of caustic soda so as to reduce losses incident to excessive saponification.

Another object is to provide for the more effective removal of soapstocks from caustic soda refined glyceride oils.

Another object is to provide an improved process adaptable to batch and continuous operation for extracting and refining glyceride oils from solid source materials thereof and rendering the resultant residue of the source materials palatable as animal feed.

Further objects and advantages will become apparent in the subsequent description in the specification.

The drawings constitute continuous portions of a single schematic diagram of apparatus suitable for carrying out the process of the present invention in a combined prepress solvent refining system. For purposes of convenience in reference the portions are identified as Fig. 1, Fig. 2 and Fig. 3, respectively and constitute successive portions, in numerical order, of the apparatus.

Understanding of the present invention and its practice in the apparatus shown in the drawings, or elsewhere, is facilitated by brief preliminary reference to particularly noteworthy steps of the process, as follows:

1. The preconditioning of animal or vegetable source material of glyceride oil for removal of oil therefrom by any desired procedure, such as expeller, solvent, compression or other extraction.

2. The recycling of extracted oil through an homogenizer or other vigorous mixing apparatus for a period of from 15 to 90 seconds after the addition of caustic soda thereto without any substantial temperature increase to achieve rapid agglomeration of soapstocks contained therein with a minimum loss of oil. While the use of caustic soda in oil refining is known, it conventionally is interacted with the oil and fatty acids contained therein for a period of from 10 to 30 minutes and at elevated temperatures after which less color removal is achieved, less effective refining attained, and greater refining loss experienced than under this step of the present invention.

3. The heating of the extracted oil containing soapstocks formed during the vigorous mixing step to a temperature sufficient to melt and agglomerate the soapstock while gently stirring the mixture and continuing to stir the mixture subsequent to the melting and agglomeration of the soapstock while the mixture is cooled to a temperature of between approximately 80° F. and 110° F.

These steps possess particular advantages when used in conjunction with each other and significant utility even when individually applied to conventional processes.

In the drawing:

A conventional screw conveyor is indicated generally at 10 suitable for supplying a continuous flow of animal or vegetable source material for glyceride oils or fats, not shown, to the system. The conveyor has an outlet 11 connected to a standard cooker 12 which conveniently is of the five ring type shown.

The cooker 12 provides a discharge 15 connected for the gravitational flow of cooked source material for the oil to a screw press 16 or other suitable means for pre-compressing initial quantities of the oil from the material. As will subsequently be appreciated, all extracted oil can be removed by the pre-press if it is desired to avoid further extracting operations. Pre-press expeller oil is delivered by a conduit 17 from the pre-press to an expeller oil head tank 18.

Pre-pressed source material for the oil, usually referred to following the pre-press 16 as "meal" and which normally contains approximately 8 to 14 percent oil by weight, is delivered from the pre-press to flaking rolls 20 by a meal duct 21. The source material for the oil is preferably thoroughly comminuted prior to delivery to the cooker and it will be apparent that the action of the pre-press 16 and the flaking rolls 20 thereon serve further to comminute the same. As employed herein, "comminuted" is intended to include any operation by which the source material is reduced to minute particle size for access to the oil, free fatty acids, waxes, gums, color bodies, gossypol and other impurities contained therein.

A conventional extracting column is represented at 23. A delivery pipe 24 is extended from the flaking rolls 20 to an upper portion of the extracting column and serves to deliver the meal in flaked-cake form from the rolls to the column. Any suitable source 25 of solvent, such as normal hexane, is connected to the lower end portion of the extracting column 23 by a solvent supply line 26, in the well known manner.

The structure described to this point is entirely conventional and a considerable portion of the remainder of the apparatus to be described will be recognized as conventional. However, the present invention provides for the mixing of a non-toxic alkali metal salt with the source material for the oil before it reaches the position of principal extraction of oil therefrom. Thus, the non-toxic alkali salts can be introduced into the system shown, in the pipe 24, flaking rolls 20, duct 21, press 16, discharge 15, cooker 12, or conveyor 10 but because of the extracting of pre-press expeller oil in the press 16, the salts are preferably introduced in advance of the press. A salt feed regulating apparatus 28 is shown in the discharge 15 of the cooker 12 and serves to add the reagent to the comminuted source material at a rate of from 0.01% to 10.0% (solid basis) of the weight of the source material being processed. The feed regulating apparatus may take innumerable forms but is conveniently an electrically operated vibratory feed of well known form which is readily controlled by varying the electrical supply thereto. The feed regulating apparatus is connected to a hopper 29 by a salt feed line 30. Suitable alkaline salts such as soda ash, sodium carbonate, sodium bicarbonate, urea, sodium phosphate, trisodium phosphate, or the corresponding calcium or potassium salts are supplied in the hopper 29. Small quantities of sodium hydroxide may also be employed for the purpose. Although the hopper and feed apparatus are suited to the supplying of appropriate salts to the source material for the oil preliminary to extraction, it will be apparent that the salts may be supplied in solution, if desired. Obviously none of the salts can be of desired effect until accompanied by sufficient moisture to permit their ionization and desired chemical activity. It is found, however, that many source materials for the oil contain sufficient initial moisture for the purpose and that almost all such materials contain adequate moisture after passing through the cooker 12.

A significant feature of the present invention is the interaction of the non-toxic alkali metal salt or sodium hydroxide with color bodies, waxes, gums, free fatty acids, gossypol and/or other impurities contained in the source material preliminary to the principal extraction of oil therefrom. Such fatty acids, gums, waxes, color bodies, gossypol and the like are initially oil soluble. Their interaction with any of the described materials renders them water soluble with the result that they have a marked affinity for the solid portions of the source material rather than the oil contained therein and are deposited on said solid portions. The feed regulating apparatus is adjusted to flow a stream of the selected salt into the stream of comminuted source material in a relative rate of flow sufficient to react with substantially all of the free fatty acids, waxes, gums, color bodies, gossypol and the like therein with no appreciable excess. The passage of solvent upwardly through the extracting column in the well known manner removes oil from the source material which thereafter descends as a residue in the extracting column having the resultant salts of the free fatty acids, waxes, gums, color bodies and gossypol therein. It is also worthy of note that the interaction of the non-toxic alkali salt with the free toxic gossypol converts the same to non-toxic combined gossypol.

Although the amount of solvent employed in solvent refining processes has been regarded as critical, for example in the patent to Mattikow, No. 2,516,957 it is pointed out that the solvent must not exceed 33% based upon the weight of the oil, the present invention avoids the care required in this respect. Successful refining of vegetable oils in miscella according to the process of the pesent invention has been readily accomplished with solvent ratios of from 10%, or less, to 80% based on the weight of the oils.

Residue from the extracting column 23 is removed by a screw conveyor 32 and delivered through a pipe 33 to a drier 34 where the moisture and solvent contained therein are removed. Such driers are well known and not described in greater detail.

Mixed oil and solvent in miscella form is passed from the extracting column 23 through a filter 38 and delivered to a miscella head tank 39.

A proportionometer is shown at 41 in Fig. 2. An expeller pump 42 is connected to the expeller oil head tank 39 and to a rotometer 43 for gauging purposes. Valves 44 and 45 permit the pumping of expeller oil from the tank optionally to the rotometer 43 or to an oil storage tank, not shown.

The miscella head tank 39 has an outlet 47 providing a valve 48. A miscella pump 49 is connected to the tank 39 through the valve 48 and through a second valve 50 in series therewith. The pump 49 is connected to a second rotometer 51. A T-duct 52 interconnects the rotometers and the proportionometer 41 for the selective delivery of expeller oil or miscella thereto.

A caustic soda tank 54 adapted to contain caustic soda solution is also connected to the proportionometer. The tank provides a caustic soda supply duct 55, a water supply duct 56 and an air supply 57 of any suitable forms, as are well known in the art. The proportionometer is adjustable to regulate proportions of mix of caustic soda from the tank 54 with expeller oil or miscella from the tanks 18 or 39. From 1% to 10% lye of from 4% to 25% concentration is sufficient and the exact proportion selected is dependent upon the type of oil and degree of refining desired.

Mixed miscella and caustic soda or mixed expeller oil and caustic soda are delivered to an homogenizer 60 through a delivery line 61. The homogenizer preferably provides a capacity greater than the supply capacity of the line 61. The homogenizer has an inlet 62 and an outlet 63. The line 61 is obviously connected to the inlet and the inlet and outlet interconnected by a bypass 64 so that the excess capacity of the homogenizer over the delivery line 61 is utilized in recycling miscella and caustic soda or expeller oil and caustic soda through the homogenizer for a period of from 15 to 90 seconds. For example, in a commercial extracting and refining plant utilizing the process of the present invention the line 61 has a capacity of from 5 to 18 gallons per minute while the homogenizer has a positive displacement of approximately 20 gallons per minute. This enables the homogenizer to recycle the mixture therethrough for the desired period and without additional heat the homogenizer is able to agglomerate soapstock formed in the oil or miscella by the caustic soda and achieves a suitable "break" in the few seconds it is recycled rather than in the 20 to 30 minutes during which caustic soda is reacted upon oil in conventional caustic soda refining processes. It will be evident that this step of the present invention is not necessarily limited to performance in an homogenizer, any device capable of achieving sufficiently vigorous mixing being suitable for the purpose. Just how vigorous the mixing must be to accomplish the requisite quick interaction for the improved results described, is also demonstrated by referring to homogenizer operation. When the homogenizer through which the mixture is being recycled is operated at a pressure of substantially less than 300 pounds per square inch, the action is of the protracted conventional duration with the concomitant disadvantages of excessive saponification and other difficulties. When above 300 lbs. p. s. i., the action is completed in a few seconds and superior refining with minimum loss attained. Best results are achieved at pressures of from 500 to 750 lbs. p. s. i. but excellent results have been attained at even 2000 lbs. p. s. i., well within the range of homogenization.

After recycling in the homogenizer, the mixture may be directed through an economizer section 69 of a heat exchange device 70 and thence successively through a heating section 71 and a cooling section 72 thereof. The heat exchange device may be heated and cooled in any suitable manner. The mixture from the homogenizer flows through the heating section 72 for a period of from approximately 5 to 10 minutes and is heated therein to a temperature approximating but less than the temperature of vaporization of the solvent in the miscella. When hexane is used as the solvent, the mixture is heated to approximately 140° F. The heating of the mixture and its passage over baffles, not shown, in heating section stirs the mixture for the 5 to 10 minutes it remains therein and the soapstock formed by the free fatty acids and caustic soda in the homogenizer is melted and agglomerated.

Subsequent to the melting and agglomerating of the soapstock in the heating section 71, the mixture is flowed through the cooling section where its temperature is reduced to between approximately 80° F. and 110° F. The mixture takes from 5 to 10 minutes to pass through the cooling section and is also stirred therein by passage over baffles, not shown. The stirring of the mixture at reduced temperature causes the soapstock to settle so that a two-phase system for centrifugation is established.

From the cooling section 72 of the heat exchange device 70, the mixture and settled soapstock is delivered to a soap centrifuge 74 where the soapstock is removed from the mixture and directed as by a pump 75 back to the pipe 33 and where it descends with the residue from the extracting column 23 into the drier 34 and is dried and applied to the residue.

It is found that the residue contained in the soapstock is highly palatable as animal feed. It has recently been discovered that the addition of the soapstock to the residue improves the nutrient value thereof. It will also be recalled, that the interaction of the non-toxic alkali salts with the gossypol in the source material rendered the gossypol non-toxic. The residue resulting from the process of the present invention is palatable as feed for even non-ruminant animals.

The mixture from which the soapstock is removed in the centrifuge 74 consists of miscella, when the miscella is fed to the proportionometer 41, and of oil when oil is fed to said proportionometer. In either instance, a substantial portion of water is added thereto for the well known purpose of removing traces of soapstock therefrom. For this purpose the mixture from which the soapstock has been removed is directed by a pump 77 from the centrifuge 74 through a water-wash mixer 78 to a wash centrifuge 79 of any suitable form which serves to remove the water from the mixture. A water pump 80 delivers water removed by the centrifuge 79 to a decanter 81. The water delivered to the decanter contains solvent which is separated from the water in the decanter and re-utilized. The water is discarded. In the absence of solvent, as when oil is refined other than in miscella, no solvent is available for recapture and the water is simply discarded as in other known methods of refining.

A miscella pump 84 is connected to the centrifuge 79 through a valve 85 and serves to deliver miscella from the centrifuge 79 successively to a pre-heater 86, evaporator 87, flash chamber 88 and stripper 89 of well known form to remove any solvent contained therein. The flash chamber and the stripper are provided with an evaporator condenser 90 and a stripper condenser 91 respectively for the usual purposes.

A pump 95 is connected to the stripper and serves to direct oil therefrom optionally to an oil storage, not shown, or to a vacuum drier 96 having the usual condenser 97, as desired. Oil treated in the vacuum drier 96 is also pumped to the oil storage by means of a drier pump 98.

For many purposes, miscella delivered to the tank 39 is sufficiently refined by the admixture of the non-toxic alkali metal salts with the source material and needs no further refining by the described recycling in the homogenizer 60 or treatment in the heating section 71 and cooling section 72 of the heat exchanging device 70. Such miscella can be directed from the miscella tank 39 to the miscella pump 84 by a line 99 connected to the outlet 47 between the valves 48 and 50 and to the pump. To close off the line 99 when desired, a valve 100 is provided therein.

In the practice of the present invention, non-toxic alkali salt is mixed with source material for the glyceride oil which has been comminuted prior to the delivery by the conveyor 10 by the pre-press 16, and/or by the flaking rolls 20 or other suitable comminuting means. The salt is mixed with the comminuted material in the presence of sufficient moisture to form a solution of the reagent. The moisture may be inherent in the source material, supplied by the cooker, or furnished by utilizing the salts in aqueous solution rather than dry form. The salts interact with the described impurities in the source material and convert them from oil soluble in nature to water soluble. The impurities then adhere to the solid portions of the source material and the oil may be conveniently extracted therefrom by any suitable means such as by the press 16, the solvent extraction column 23, or other suitable means.

Whether the oil is removed from the source material in miscella or as relatively pure oil, it can be further refined by the addition of caustic soda thereto. The recycling through the homogenizer 60 for from 15 to 90 seconds so as to effect a very rapid saponification of the free fatty acids present and rapid interaction with remaining color bodies and other impurities is preferred. This rapid interaction is conducted without additional heat and can only achieve the described advantages if the mixing is approximately as vigorous as that made possible in homogenizers.

Subsequent to the speedy saponification of the free fatty acids in the homogenizer, the mixture is delivered to the heating section 71 where the mixture is heated to approximately 140° F. and stirred for from 5 to 10 minutes to melt and agglomerate the soapstock. Subsequently, the mixture is stirred from 5 to 10 minutes in the cooling section at a temperature of between approximately 80° F. and 110° F. where the mixture is separated into a two-phase system suitable for centrifugation. Thereafter, the soapstock is removed and the resulting miscella and/or oil treated as described or in any other desired manner. It will be noted that the entire process performed in a closed system which minimizes loss by vaporization and other discharge, assures improved safety, minimizes the introduction of impurities, and excludes air so that the frothing which occurs in the presence of air in the homogenizer and the deleterious color effect of the air on certain oils are avoided.

Prior to the present invention, the extraction of glyceride oils constituted an operation separate and apart from the refining of the oils subsequent to extraction. The process of the present invention is excellently suited to the continuous joint extraction and refining and in addition to the advantages of the continuity of operation of the over-all process, portions thereof are readily contrasted with the results heretofore attainable by known extraction and refining practices.

For example, in order to obtain a dependable averaging of results, the free fatty acid content, the settlement refining loss, and the Lovibond Color Red of fourteen tank truck shipments of oil produced from cotton seed by conventional extraction processes were measured. The free fatty acid content was found to average 1.15%, the settlement refining loss to average 5.14% and the average Lovibond Color Red to be 3.99. For comparison purposes, seed from the same seed pile from which the oil was conventionally extracted was comminuted and a non-toxic alkali salt of the character described intimately admixed therewith to convert the normally oil soluble, free fatty acid, waxes, gums, color bodies, and other impurities to water soluble in nature prior to the preliminary extraction of the oil therefrom. Six tank truck shipments of oil extracted from the seed so preconditioned, had an average free fatty acid content of 0.43%, an average settlement refining loss of 2.25%, and an average Lovibond Color Red of 3.97. The obvious significance in the trade of a reduction of the free fatty acid content to approximately one-third, of the refining loss to less than one-half and the improvement in the color will readily be apparent. The analyses of the oils were made according to the Rules of the National Cotton Seed Products Association in accordance with Section 5, Rule 274. In addition, the free gossypol content of the residue after extraction of the oil was reduced by approximately 25% and was converted to combined non-toxic gossypol. The resulting meal was found suitable for non-ruminant animals and poultry for growing and fattening purposes.

Soda ash and caustic refineries have heretofore been popular and additional advantages of the process of the present invention are readily apparent by comparing the subject process with the soda ash and caustic refining processes. It is known that the soda ash process, as typified by the patents to Clayton et al. Nos. 2,190,593; 2,190,594; 2,219,088; 2,249,702; and 2,412,251 achieves superior results in the refining of glyceride oils as compared with the caustic process. The equipment and machinery required for the performance of the soda ash process, however, is substantially greater than that required for the caustic soda processes. For example, equipment and machinery for a four tank car per day soda ash refinery at one time was quoted at $82,000 as compared with $50,000 for a caustic refinery having the same capacity. The difference in price has proved significant to many refineries who have selected the caustic refining process becaue of the lower investment required. The equipment and machinery necessary to convert the caustic refinery to the practice of the process of the present invention was, at the same time, approximately $2,000. Thus, although the equipment and machinery required for the present invention exceeds that for caustic refining, the investment is approximately 40% less than that required for soda ash refining.

Oil extracted and refined by the process of the present invention is generally superior in its degumming, dewaxing, color removal, and other properties, as compared to conventional soda ash refined oil, except it possesses a slightly higher free fatty acid content. It is subject to appreciably less refining loss and does not possess the disadvantage of the production of carbon dioxide referred to in the patent to Clayton et al. No. 2,249,702.

Although illustrated by reference to a combined prepress and solvent refining apparatus, the subject invention is applicable to any known extraction apparatus such as that employed for solvent extraction per se, expeller extraction, hydraulic compression, filtration extraction, friction extraction, or other process. Its reduction in investment requirements, its efficiency and economy of performance, the high quality of the resultant oil, and the improved quality of resultant meal automatically conditioned for use as cattle and poultry feed, clearly demonstrate the significance of the described process.

While the invention has been illustrated and described in what is at present regarded as the most practical and preferred embodiment, it is recognized that departures may be made therefrom within the scope of the invention, which is not to be limited to the details disclosed herein but is to be accorded the full scope of the claims so as to embrace any and all equivalent methods and processes.

Having described my invention, what I claim as new and desire to secure by Letters Patent is:

1. In a process for refining glyceride oils and fats in miscella by the admixture of caustic soda therewith to neutralize free fatty acids in the oil and to improve the color properties of the oil as a result of which soapstock is formed, the step of recycling the caustic soda and miscella through an homogenizer for a period of from 15 to 90 seconds promptly after the admixture of the caustic soda with the miscella so as to achieve the neutralization of the free fatty acids and the improvement of the color in the shortest possible time and with a minimum of saponification of the oil itself.

2. In a process for refining glyceride oils in miscella containing hexane by the admixture of caustic soda with the miscella to neutralize free fatty acids of the oil and to improve the color properties of the oil and as a result of which soapstock is formed, the steps of recycling the miscella through an homogenizer for a period of from 15 to 90 seconds promptly upon the admixture of the caustic soda with the miscella so as to neutralize the free fatty acids and improve the color of the oil with a minimum of saponification of the oil itself; thereafter heating and gently stirring the resultant miscella and soapstock mixture for a period of from 5 to 10 minutes at a temperature at least about 140° F. whereby the soapstock is melted and agglomerated; and subsequently cooling and continuing to stir the mixture for a period of from 5 to 10 minutes at a temperature of from approximately 80°

F. to 110° F. whereby the agglomerated soapstock is caused to settle from the miscella so that a two-phase system for centrifugation is established.

3. A combined extracting and refining process, for glyceride oils and fats contained in a solid source material thereof having oil soluble impurities, comprising comminuting the source material; cooking the particles of the source material to soften the structure thereof and impart moisture thereto; mixing a dry alkaline material with the source material to render the oil soluble impurities of the source material water soluble whereby said impurities are deposited on the source material by their affinity for the moisture content thereof; passing a solvent for the glyceride oils through the source material to extract the oil from the source material and water soluble impurities deposited thereon; mixing caustic soda with the extracted oil in a quantity sufficient to neutralize the free fatty acid content thereof and to hydrolyze remaining pigments and phosphatidic impurities remaining in oil to form soapstock; and recycling the extracted oil and caustic soda through an homogenizer rapidly to form soapstock of the free fatty acids and to hydrolyze remaining pigments and phosphatidic impurities remaining in the oil and to agglomerate the soapstock.

4. A combined extracting and refining process for glyceride oils and fats contained in a solid source material having oil soluble impurities and moisture therein, comprising reducing the source material to minute particle size; cooking the source material to soften the same and add moisture thereto; mixing a dry alkaline reagent with the source material to render the normally oil soluble impurities in the comminuting material water soluble following the cooking of the source materials by the interaction of an alkaline reagent therewith in the presence of the source materials whereby the resultant water soluble impurities are deposited on the particles of the source material by affinity for the moisture content thereof; mixing a solvent or glyceride oil in which the water soluble impurities are insoluble with the source material and said water soluble impurities whereby the oil is dissolved in the solvent to form a miscella; separating the miscella from the particles of the source material and water soluble impurities deposited thereon; recycling the resultant mixture with caustic soda through the homogenizer for a period of from 15 to 90 seconds to form soapstock of free fatty acids contained in the miscella; heating the mixture to a temperature approximating but less than the temperature of vaporization of the solvent while stirring the mixture to melt and agglomerate the soapstock; cooling the mixture after the soapstock is melted and agglomerated to a temperature in the range of 80° F. to 110° F. while continuing to stir the same to cause the soapstock to settle so that a two-phase system for centrifugation is established; removing the soapstock from the two-phase system by centrifugation; and thereafter removing the solvent by volatilization from the oil.

5. A combined extracting and refining process for glyceride oils and fats contained in a solid source material having oil soluble impurities and moisture therein; comprising reducing the source material to minute particle size; cooking the source material to soften the same and add moisture thereto; mixing a dry alkaline reagent with the source material to render the normally oil soluble impurities in the comminuting material water soluble following the cooking of the source materials by the interaction of an alkaline reagent therewith in the presence of the source materials whereby the resultant water soluble impurities are deposited on the particles of the source material by affinity for the moisture content thereof; mixing a solvent for glyceride oil in which the water soluble impurities are insoluble with the source material and said water soluble impurities whereby the oil is dissolved in the solvent to form a miscella; separating the miscella from the particles of the source material and water soluble impurities deposited thereon; adding caustic soda to the miscella to neutralize free fatty acids contained therein; promptly after adding the caustic soda recycling the miscella and caustic soda for a period of from 15 to 90 seconds through an homogenizer to form soapstock of the free fatty acids and remaining phosphatides and color bodies and to achieve a rapid agglomeration of the soapstock; concurrently stirring and heating the miscella and soapstock to a temperature approximating but less than the boiling point of the solvent to melt and agglomerate the soapstock; continuing to stir the miscella and soapstock after the soapstock is melted and agglomerated while cooling the same to a temperature in a range of 80° F. to 110° F. to establish a two-phase system for centrifugation; centrifugally separating the soapstock from the two-phase system; and thereafter removing the solvent by volatilization from the refined oil.

6. The process as defined in claim 5 in which hexane is employed as the solvent.

7. The process as defined in claim 5 in which the concurrent heating and stirring of the miscella and soapstock is continued for a period of from 5 to 10 minutes, and the cooling and stirring of the miscella and soapstock is continued for a similar period of from 5 to 10 minutes.

8. A continuous process for extracting and refining glyceride oils and fats contained in solid source material thereof having oil soluble impurities and moisture therein and for rendering the residue of the source material palatable for cattle and poultry feed comprising comminuting the material and forming a stream thereof; intimately mixing a stream of non-toxic alkaline reagent with the stream of comminuted material in the presence of sufficient water to form a solution of the reagent whereby the oil soluble impurities of the source material are rendered water soluble and deposited on particles of the source material by affinity of said impurities for the moisture content thereof; mixing a stream of hexane with the stream of source material and reagent solution to extract oil from the source material and to form a miscella in the presence of the reagent solution; continuously removing particles of source material together with the water soluble impurities deposited thereon from the miscella and reagent solution; mixing a stream of caustic soda solution with the miscella and reagent solution; recycling the miscella, caustic soda solution, and reagent solution through an homogenizer for a period of from 15 to 90 seconds to form soapstock of the residual fatty acids; heating and stirring the resultant mixture while in continuous flow to a temperature approximating but less than the boiling point of hexane for a period of from 5 to 10 minutes to melt and agglomerate the soapstock present; cooling and stirring the mixture while in continuous flow to a temperature in the range of from 80° F. to 110° F. for a period of from 5 to 10 minutes to cause the soapstock to settle so that a two-phase system is established; flowing the two-phase system through a centrifuge continuously to remove soapstock therefrom; mixing the soapstock continuously delivered from the centrifuge with the residue of source material and water soluble impurities previously removed from the mixture; and separately removing the solvent by vaporization from the refined oil and from the mixed residue and soapstock, said process being conducted in a closed system to prevent the loss of solvent and admixture of air and impurities with the materials in the process.

References Cited in the file of this patent
UNITED STATES PATENTS

| | | |
|---|---|---|
| 705,785 | Philips | July 29, 1902 |
| 1,225,664 | Lenders et al. | May 8, 1917 |
| 1,278,073 | Philips | Sept. 3, 1918 |
| 1,515,947 | Hall | Nov. 18, 1924 |

(Other references on following page)

UNITED STATES PATENTS

| | | |
|---|---|---|
| 2,223,077 | Stadt | Nov. 26, 1940 |
| 2,239,747 | Thurman | Apr. 29, 1941 |
| 2,412,251 | Clayton | Dec. 10, 1946 |
| 2,575,957 | Mattikow | Dec. 4, 1951 |
| 2,686,796 | Markley et al. | Aug. 17, 1954 |

OTHER REFERENCES

Bailey: "Industrial Oil and Fat Products," 2nd ed., published by Interscience (N. Y.), 1951 (pages 632–633 relied on).